(12) United States Patent
Petrick (10) Patent No.: US 9,043,252 B2
(45) Date of Patent: *May 26, 2015

(54) SYSTEMS AND METHODS FOR ANALYSIS OF NETWORK EQUIPMENT COMMAND LINE INTERFACE (CLI) AND RUNTIME MANAGEMENT OF USER INTERFACE (UI) GENERATION FOR SAME

(71) Applicant: Christopher S. Petrick, Cedar Park, TX (US)

(72) Inventor: Christopher S. Petrick, Cedar Park, TX (US)

(73) Assignee: Dell Products LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/255,617

(22) Filed: Apr. 17, 2014

(65) Prior Publication Data

US 2014/0229599 A1   Aug. 14, 2014

Related U.S. Application Data

(63) Continuation of application No. 13/238,807, filed on Sep. 21, 2011, now Pat. No. 8,744,980.

(51) Int. Cl.
*G06F 15/18*   (2006.01)
*H04L 12/24*   (2006.01)

(52) U.S. Cl.
CPC ............ *H04L 41/145* (2013.01); *H04L 41/142* (2013.01); *H04L 41/22* (2013.01); *H04L 41/0213* (2013.01)

(58) Field of Classification Search
None
See application file for complete search history.

(56) References Cited

U.S. PATENT DOCUMENTS

| | | | |
|---|---|---|---|
| 5,991,806 A | 11/1999 | McHann, Jr. | |
| 6,833,787 B1 | 12/2004 | Levi | |
| 7,181,519 B2 | 2/2007 | Pillai et al. | |
| 7,254,778 B2 | 8/2007 | Dikhit | |
| 7,266,678 B2 | 9/2007 | Wilks | |
| 7,536,448 B2 | 5/2009 | Hasan et al. | |
| 7,882,213 B2 | 2/2011 | Garg et al. | |
| 2002/0010908 A1 | 1/2002 | Cheng et al. | |
| 2004/0160464 A1 | 8/2004 | Reyna | |
| 2006/0190579 A1 | 8/2006 | Rachniowski et al. | |
| 2007/0165536 A1* | 7/2007 | Lee et al. ................. | 370/252 |
| 2007/0168416 A1 | 7/2007 | Lim | |
| 2007/0282875 A1 | 12/2007 | Koss et al. | |
| 2008/0046873 A1 | 2/2008 | Rumsey | |
| 2009/0187970 A1 | 7/2009 | Mower et al. | |
| 2011/0093690 A1 | 4/2011 | Vyssotski et al. | |
| 2012/0030272 A1* | 2/2012 | Bristow et al. ............ | 709/203 |
| 2013/0073486 A1 | 3/2013 | Petrick | |

OTHER PUBLICATIONS

Wikipedia, "Ontology (information science)", Printed from Internet Jul. 25, 2011, 11 pgs.

(Continued)

*Primary Examiner* — Li-Wu Chang
(74) *Attorney, Agent, or Firm* — Egan, Peterman & Enders LLP.

(57) ABSTRACT

Systems and methods are disclosed that may be implemented for network management system (NMS) configuration management support for network devices using a learning and natural language processing application to capture the usage and behavior of the Command Line Interface (CLI) of a network device with the aid of a CLI knowledge model, which in one example may be ontology-based.

26 Claims, 8 Drawing Sheets

(56) References Cited

OTHER PUBLICATIONS

Dell, "Dell OpenManage Network Manager", Printed from Internet Jul. 22, 2011, 2 pgs.
Dell, "Dell Network Management", Printed from Internet Jul. 22, 2011, 2 pgs.
Noy et al., "Ontology Development 101: A Guide to Creating Your First Ontology", Obtained From Internet Oct. 3, 2013, 23 pgs.
Wikipedia, "Ontology", Obtained From Internet Oct. 3, 2013, 12 pgs.
Neches et al., "Enabling Technology for Knowledge Sharing", AAAI, 1991, 21 pgs.
Gruber, "Ontology", Encyclopedia of Database Systems, 2009, 5 pgs.
ISO/IEC PDTS, Information Technology-Business Agreement Semantic Descriptive Techniques, Part 4, Jan. 17, 2006, 59 pgs.

* cited by examiner

SYSTEMS AND METHODS FOR ANALYSIS OF NETWORK EQUIPMENT COMMAND LINE INTERFACE (CLI) AND RUNTIME MANAGEMENT OF USER INTERFACE (UI) GENERATION FOR SAME

This application is a continuation of pending U.S. patent application Ser. No. 13/238,807, filed on Sep. 21, 2011 and entitled "Systems And Methods For Analysis Of Network Equipment Command Line Interface (CLI) And Runtime Management Of User Interface (UI) Generation For Same," the entire disclosure of the foregoing application being incorporated herein by reference.

FIELD OF THE INVENTION

This invention relates generally to network equipment and, more particularly, to analysis of command line interface (CLI) and management of user interface (UI) for the same.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often networked together into networking systems that include a variety of different information handling system types performing different functions within the network. Recently, there has been a rapid growth in network equipment types, as well as types of networking systems. New network architectures, services, equipment and features are added/modified in the market place at a rapid pace. Thus, networking systems are tasked with providing an increased diversity of services using a growing breadth of network architectures, devices, components, and features from different vendors.

Figure 1A:
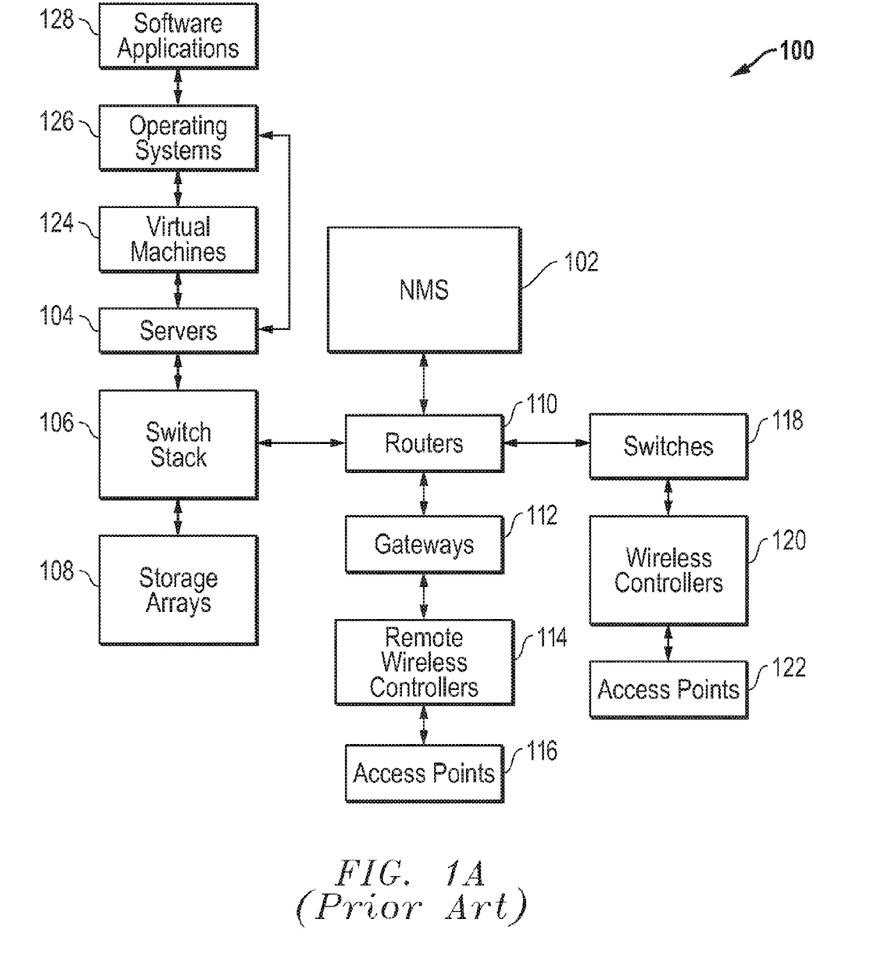
FIG. 1A illustrates a block diagram of a conventional networking system.

A block diagram of a conventional networking system 100 is illustrated in FIG. 1A. The deployed networking system 100 of FIG. 1A is composed of multiple network devices from different vendors. These network devices include servers 104, switch stack 106, storage arrays 108, routers 110, gateways 112, remote wireless controllers 114, access points 116, switches 118, wireless controllers 120, and access points 122. Also shown are virtual machines 124, operating systems 126, and software applications 128 that may be executing on servers 104. A network management system (NMS) 102 may be provided as shown to assist with network management and service provisioning. NMS 102 is a combination of hardware and software components configured to maintain and administer a networking system, and is typically implemented on an information handling system configured as a server or administrator computer that communicates with the various network devices through network router devices 110, switch stack 106 and switches 118 as shown. One example of such a NMS is a Dell OpenManage Network Manager available from Dell Products L.P. of Round Rock, Tex.

NMS systems are challenged with maintaining parity with new network equipment and equipment firmware/software. NMS configuration management functionality can lag months and years behind the network devices available in the market. Moreover a NMS cannot know all the possible ways a user wants to configure a device. Additionally, an increased amount of security maintenance is required for operators granting configuration access on a device by device basis.

Integrating device support into a NMS is tedious, time consuming and expensive. In addition to maintenance of parity, each new device, operation system or command line interface (CLI) command structure typically requires NMS development to start from zero. A development team typically must study the behavior of the devices with regard to factors such as the following: 1) Available application programming interfaces (APIs) such as SNMP, CLI, and Web APIs; 2) Timing and sequence of management messages from NMS to/from device, including command count per message, time delay between messages, and different command and parameter values; and 3) device responses between commands, such as success responses, error responses, error codes, and interrupts. For all the variances in devices and firmware, NMS development teams are required to perform analysis, design, and test. Device behavior, changes, timings, sequences are not documented in a machine readable format.

Additionally, existing protocols have limited impact on integration. SNMP is an active standard that enables machine to machine communication using a protocol. Existing SNMP protocols are a cumbersome path to use for network configuration. SNMP is a protocol designed for computer to computer interface but was not designed for user interface (Graphical, Command Line, or Web). Not all device configuration options are supported by SNMP. Furthermore, use of SNMP does not match natural configuration flow of device interfaces for example. SNMP MIBs (Management Information Base) come from different standards that evolved overtime for diverse market applications.

Furthermore, CLI API conversion is non-standard and not portable. A majority of network operators and others use CLI to configure devices, and CLI is the protocol of choice for human to machine interface. Thus, CLI is the natural forum of communication designed for the network device, and CLI is commonly used by network administrators to manage and configure devices. CLI is also used CLI for scripting and automation and is also typically available on network devices for free. Network equipment vendors typically enable management of a new feature in CLI first before any other management interface. Therefore, CLI is usually the first interface to implement new features for a product, while SNMP MIBs, on the other hand, do not implement every CLI command.

However, CLI command behaviors, timings, sequences are not documented in a machine readable format. Each vendor has its own CLI structure, syntax and operation modes. Moreover a given vendor's CLI can vary between products. Finally CLI can vary between firmware versions of the same product. License keys installed on a device can also change the CLI. Industry standard CLI definitions to be implemented are not available today and not envisioned for the future. Thus, CLI can be considered a unique management interface experience associated with a given vendor's equipment.

Figure 1B:
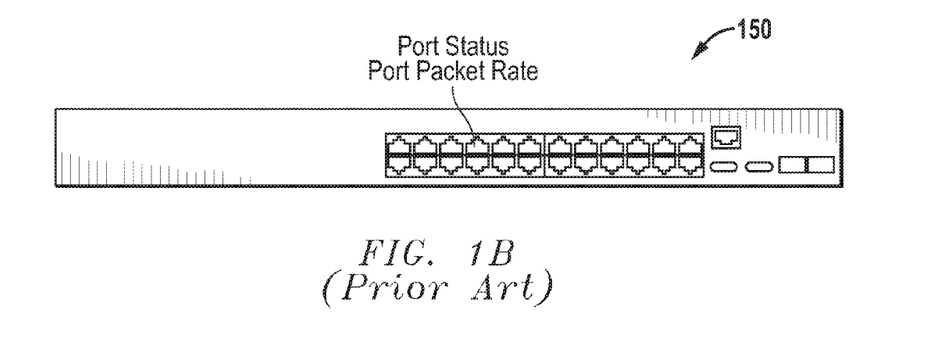
FIG. 1B illustrates a traditional UI chassis view for a network device configured as a switch.

FIG. 1B illustrates a traditional user interface (UI) chassis view 150 displayed on a display device for a network device configured as a switch. As shown in FIG. 1B, the content and topology of traditional chassis view 150 is limited to discrete information such as port status and packet rate.

SUMMARY OF THE INVENTION

Disclosed herein are systems and methods that may be implemented for NMS configuration management support for network devices using a learning and natural language processing application to capture the usage and behavior of the Command Line Interface (CLI) of a network device with the aid of a CLI knowledge model. In one embodiment, the disclosed systems and methods may be implemented to create and employ an ontology-based CLI knowledge model to generate management user interfaces (UI) at runtime. In one exemplary embodiment, the disclosed systems and methods may employ a CLI knowledge model that is incrementally developed using hierarchical language (e.g., XML or HTML format) or database and ultimately results in producing an ontology-based CLI knowledge model. In one exemplary embodiment, an ontology-based CLI knowledge model may be employed to integrate or link a NMS across a network (e.g., such as the Internet, corporate Intranet, etc.) to external sources (e.g., network resources) such as web content management systems (e.g., such as Wikis, Blogs, code repositories such as SourceForge, etc.), shopping portals or services (e.g., Amazon), warranty services (e.g., Dell), semantic web applications (e.g., GoodRelations, Twine), mapping websites (e.g., Google Maps), test and design tools (e.g., Silktest, Microsoft Visual Studio), auto generated CLI manuals, etc.

As used herein, ontology may be defined as a semantic framework that formally represents and organizes systems, concepts, schemas and relationship among them within the target domain(s) of knowledge. Ontologies rely on lower level database schemas to store data, and an ontology-based CLI knowledge model may encapsulate the semantic framework, database schema, and CLI data knowledge collected from a given network device.

In one exemplary embodiment, networking system operators may employ the disclosed systems and methods to increase and optimize the operating expense savings associated with NMS usage by providing the networking system operators with the ability to configure multiple network devices at once from a common (e.g., single) NMS configuration screen or other display type. The disclosed systems and methods may also be implemented in one exemplary embodiment to handle the increased amount of security permissions maintenance that is required for networking system operators who must grant configuration access on a network device by network device basis, e.g., by tracking the identity of entities or persons causing changes in configuration of particular network devices, as well as the types of particular changes being made on these particular network devices.

The disclosed systems and methods may be implemented to build a knowledge base for natural language text processing of CLIs. Advantages of the disclosed systems and methods may be realized over conventional NMS systems and methods without requiring modifications to existing switch equipment. These advantages include, but are not limited to, operational expense savings for the operator of a networking system, ability to quickly add support for new network devices from different manufacturers to an existing NMS, reduction in NMS development time (potentially from months to days), reduction in switch test development time, provision of "at a glance" views that are closely aligned with a user's network operations and services.

In one respect, disclosed herein is an information handling system, including: one or more processing devices configured to execute a network management system (NMS) that includes an ontology-based command line interface (CLI) knowledge model; where the one or more processors of the information handling system are configured to be communicatively-coupled across a network to one or more network devices of a networking system; and where the one or more processing devices are configured to execute the NMS to maintain and administer the networking system using the ontology-based CLI knowledge model.

In another respect, disclosed herein is a method of managing a networking system, including: providing an information handling system, the information handling system including one or more processing devices communicatively-coupled across a network to one or more network devices of the networking system; and using the one or more processors to execute a network management system (NMS) that includes an ontology-based command line interface (CLI) knowledge model to maintain and administer the networking system using the ontology-based CLI knowledge model.

DESCRIPTION OF ILLUSTRATIVE EMBODIMENTS

Figure 2A:
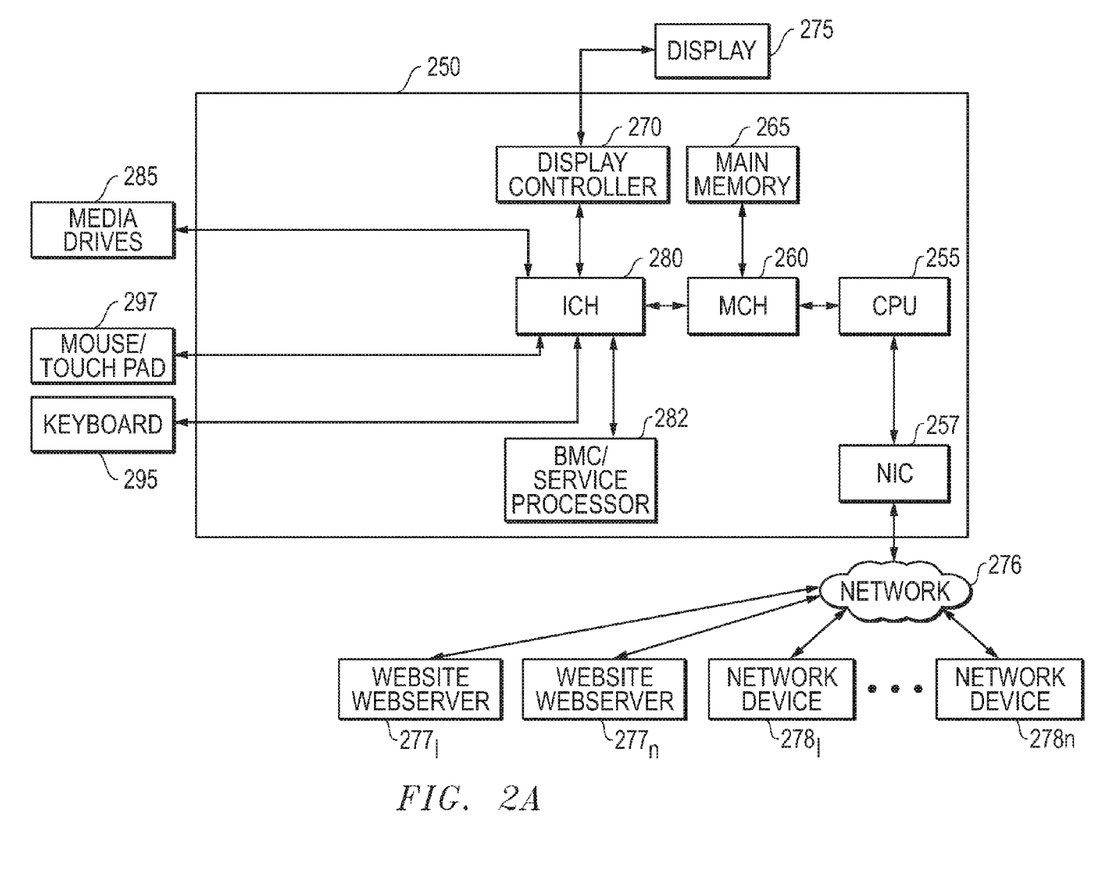
FIG. 2A illustrates a block diagram of an information handling system according to one exemplary embodiment of the disclosed systems and methods.

FIG. 2A is a block diagram of an information handling system 250 as it may be configured as a computer server system or administrator computer system implementing a network management system (NMS) including an ontology-based CLI knowledge model according to one exemplary embodiment of the disclosed systems. One example of a NMS with which the disclosed systems and methods may be implemented is the Dell OpenManage Network Manager (OMNM) available from Dell Products L.P. of Round Rock, Tex., although one or more features of the disclosed systems and methods may be implemented with any other configuration of NMS hardware and software.

As shown in FIG. 2A, information handling system 250 of this exemplary embodiment includes at least one central processing unit (CPU) 255, which may each be an Intel Pentium series processor, an Advanced Micro Devices (AMD) processor or one of many other processors or other types of suitable processing devices. System memory device 265 (e.g., random access memory RAM) is coupled as shown to CPU 255 via memory controller chip (MCH) 260 that facilitates memory operations. Also coupled to CPU 255 is network interface card (NIC) 257 to enable communication with various multiple network devices $278_1$-$278_n$, which together may form a networking system managed in a manner as further described herein by an NMS 202 that is executing on CPU 255.

Still referring to FIG. 2A, an input output hub (IOH) 280 is coupled as shown to processor 255 (e.g., together with an I/O controller hub processor chip) to facilitate input/output functions for the information handling system. One or more storage devices such as media drives 285 (e.g., hard disk drives, NVRAM, Flash or other suitable media drive devices) or any other suitable form of storage may be coupled to IOH 280 and its processor chip to provide permanent storage for the information handling system. One or more input devices (e.g., keyboard 295, mouse/touchpad 297, etc.) and a display device 275 (e.g., LCD display) together with its corresponding display controller 270 may be coupled to IOH 280 and its processor chip to enable the user to interact with the information handling system and the NMS 202 executing thereon. A service processor 282 (e.g., such as baseboard management controller "BMC") running system BIOS may also be coupled to IOH 280 and its processor chip as shown. Service processor 280 may be, for example, running real time OS or embedded Linux and also performing tasks independent of the host and BIOS, such as cooling fan control, etc.

It will be understood that the particular combination of information handling system components of FIG. 2A is exemplary only, and that a NMS including an ontology-based CLI knowledge model may be implemented to manage a networking system using any other suitable combination of additional, fewer or alternative information handling system components (e.g., including one or more processing devices). In this regard, it will be understood that a CLI may be, for example, any CLI implemented by a given network device 278 and that uses text based information exchange (e.g. text, HTML, XML or other human readable text based formats) between the device 278 and NMS 202.

Figure 2B:
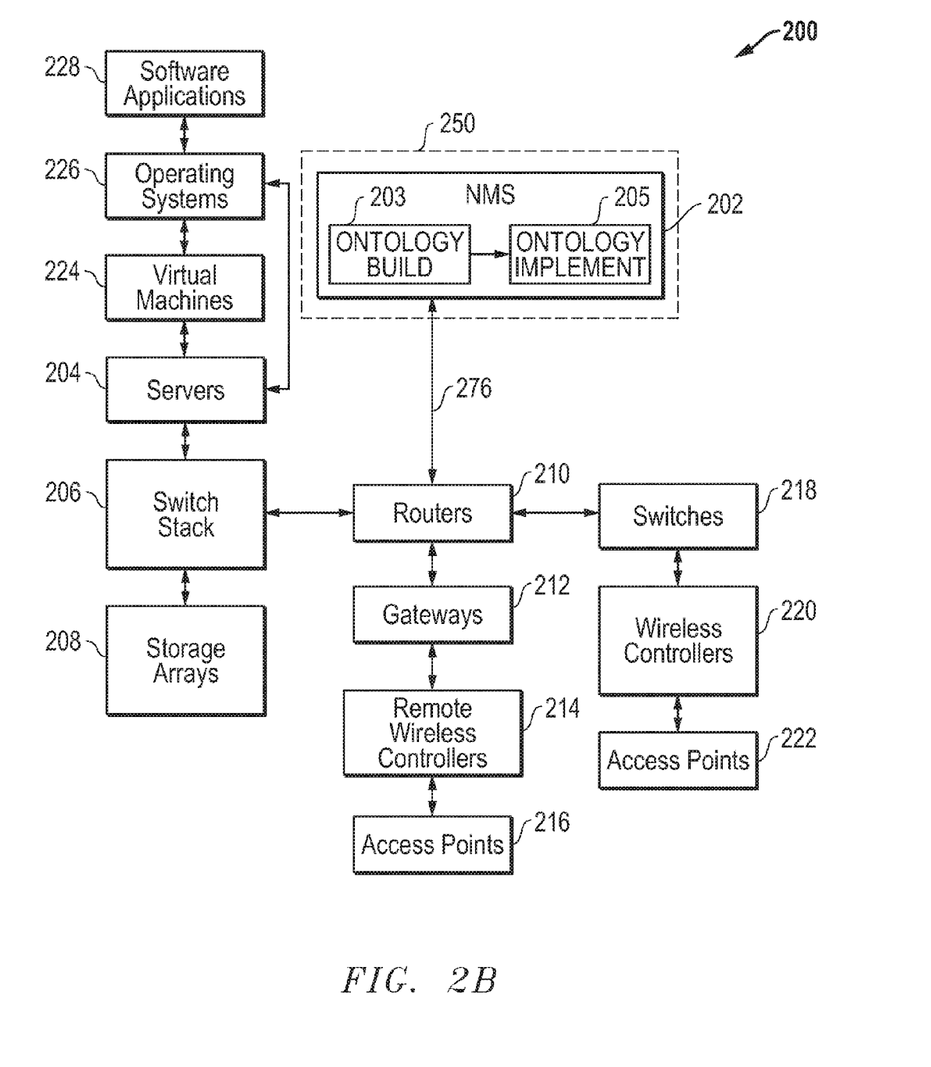
FIG. 2B is illustrates a block diagram of a networking system according to one exemplary embodiment of the disclosed systems and methods.

FIG. 2B illustrates a block diagram of a networking system 200 as it may be configured according to one exemplary embodiment of the disclosed systems and methods. As shown, the deployed networking system 200 of FIG. 2B is composed of multiple network devices, e.g., supplied from different vendors or manufacturers and that may correspond to the multiple individual network devices 278 of FIG. 2A. The network devices of this exemplary embodiment include servers 204, switch stack 206, storage arrays 208, routers 210, gateways 212, remote wireless controllers 214, access points 216, switches 218, wireless controllers 220, and access points 222. Also shown are virtual machines 224, operating systems 226, and software applications 228 that may be executing on servers 204. As illustrated, NMS 202 is provided as shown that includes an ontology-based CLI knowledge model (e.g., implemented by ontology build module 203 and ontology implementation module 205 in this exemplary embodiment) to simplify network management and service provisioning. NMS 202 is a combination of hardware and software components configured to maintain and administer a networking system using an ontology-based knowledge module and that may be implemented, for example, on information handling system 250 that communicates with the various network devices through network router devices 110, switch stack 106 and switches 118 and network 276 as shown. It will be understood that a network 276 may be any data or analog network where the NMS 202 has the ability to communicate with the device 278. Network 276 examples may include NMS IP/Ethernet networks or serial connections from the NMS 202 to the device 278.

Figure 3:
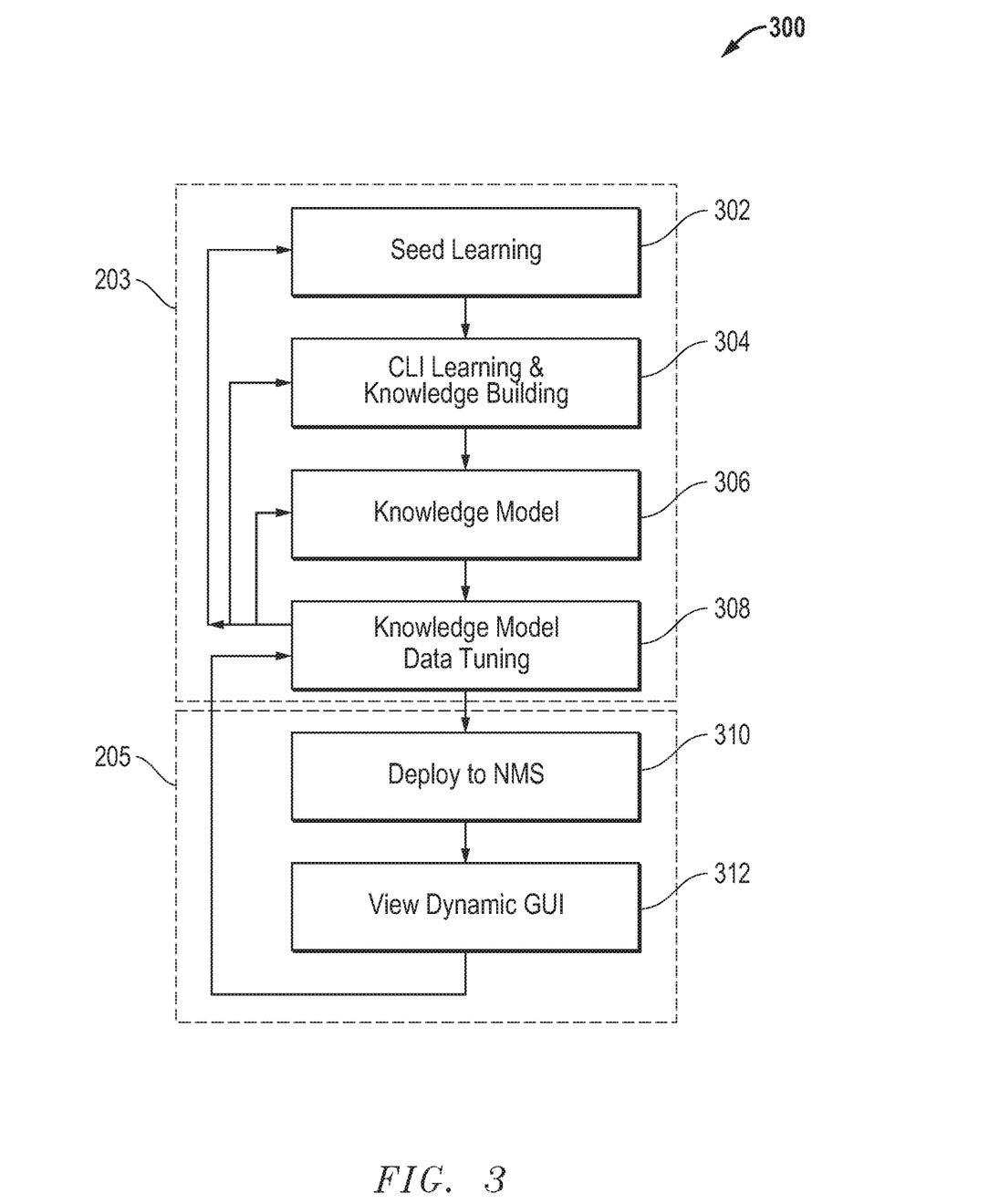
FIG. 3 illustrates methodology according to one exemplary embodiment of the disclosed systems and methods.

It will be understood that the particular combination of network devices and network architecture illustrated in FIG. 2B is exemplary only, and that a NMS 202 may be implemented with other combinations of fewer, additional, and/or different network devices. Furthermore, it will be understood that the tasks of ontology build module 203 and ontology implementation module 205 may be implemented using any other suitable combination of hardware and/or software components, e.g., on a single information handling system, or on multiple respective information handling systems FIG. 3 illustrates methodology 300 that includes a sequence of events that may be employed in one exemplary embodiment to implement NMS 202 with an ontology-based CLI knowledge model that includes ontology build module 203 executing as ontology build steps 302-308 and ontology implementation module 205 executing ontology implementation steps 310-312. For purposes of example only, methodology 300 will be described herein in reference to the exemplary networking system of FIG. 2B, it being understood that other methodology 300 may be implemented with other networking system configurations.

Still referring to methodology 300 of FIG. 3, the steps of ontology build module 203 may be implemented to initiate the knowledge model for the CLI of new network devices 278, and to update the CLI knowledge model for changes in CLI of existing network devices 278. The steps of ontology implementation module 205 may independently operate to implement NMS 202, e.g., ontology implementation module 205 may operate asynchronously with ontology build module 203 such that ontology build module 203 continuously updates the CLI knowledge model and feeds the updated results to ontology implementation module 205 which continues to execute. It will be understood that in one exemplary embodiment steps 302-312 of methodology 300 may be performed in sequence to analyze the CLI of each network device 278.

As shown in FIG. 3, ontology build module 203 begins for a given network device 278 with seed learning step 302 where build parameter information is input into or otherwise provided to build module 203, e.g., by operator input to information handling system 250 and/or input to information handling system 250 from a database. Such build parameter information includes information on how to communicate with the respective network device 278. Other build parameter information includes information on how to "walk" the CLI for the given device, such as CLI rules, CLI timing, CLI syntax, etc. Build parameter information may also include objectives which are also input into ontology build module 203 in step 302 about what and how much CLI information to collect, as well as a description of the CLI knowledge model to create.

In step 302, the following exemplary types of information may be used for seed learning: device network address (e.g., IP Address, Link Layer MAC Address); communication protocol (e.g., telnet, ssh) used to collect CLI information from the device; device protocol information (e.g., encryption certificate and protocol, device authentication (e.g., usernames, passwords) used by the NMS 202 to login into device 278; starting and stopping points in CLI; control keys available and purpose for using in CLI (e.g., control-K); session timeout where NMS 202 is has a set limit for device to respond; retry count were NMS 202 attempts to connect, login or communicate with device after session has timed out; location of knowledge model to be updated; existing knowledge model for same device or other device (e.g., networking device or operating system such as UNIX or LINUX) that enables the learning collection algorithm to enhance previously collected knowledge or to more efficiently collect additional knowledge from the device; CLI macros installed on the device or added by device users; how to activate and exit different command modes supported by CLI—user, administrator, super, global device configuration, device interface configuration, general configuration, show; command line syntax (e.g., input format; output format; number, text, and argument format; end of line; error message format); environment variables or CLI commands to setup and configure the session; and special characters (e.g., $, %, #, ', <, >, /, :, *, ?) and their use for example as wildcard character or file path.

Still referring to step 302 of FIG. 3, the CLI for a given device may be "walked" by sequentially and orderly stepping through the CLI commands, keywords, arguments, parameters, switches, variables, and macros from a specified starting point to a specified ending point or until a CLI command list has been exhausted. The output of such a walk shows the CLI output displayed in sequential order as the walk process is going through the command list. Timing is the amount of time it takes for a device 278 to respond over network 276 to a CLI stimulus from ontology build 203 and ontology implement 205.

Ontology build module 203 proceeds next to step 304 where learning and knowledge building tasks for CLI command structure and device behavior are performed. Such tasks include, for example, walking the CLI by interrogating each given network device 278 over network 276 to learn from the given device what CLI characteristics (including capabilities and other CLI characteristics) it possesses. Examples of CLI capabilities include, but are not limited to, device configuration, user administration, firmware/software/bootcode management, scripting/macros, file management, display help for commands and device, inventory and license management, diagnostics (e.g., ping, trace route). Examples of other CLI characteristics include continuation of command, CLI mode change, text based response, error response, interrupts (e.g., CLI message, syslog message, device interrupt, operating system interrupt or similar), end of line, user custom CLI variables, piping commands, special key sequences, etc. In one exemplary embodiment, this task of walking a CLI may be optionally extended and implemented by various network devices 278 on a network 276. In such an embodiment, each device 278 may dump its CLI command structure into a human or machine readable format, e.g., the CLI dumps all possible configuration, show or help commands for the given device 278, and such that the output shows all command levels, parameters and sequences. NMS 202 may also use and walk the CLI dump feature from the device 278 to integrate with runtime UI generation as described further herein in relation to FIGS. 5 and 6. When so implemented, this embodiment may be employed to enable faster integration of a device 278 into the NMS 202, but is not required by the NMS for the purpose of this disclosure.

Figure 4:
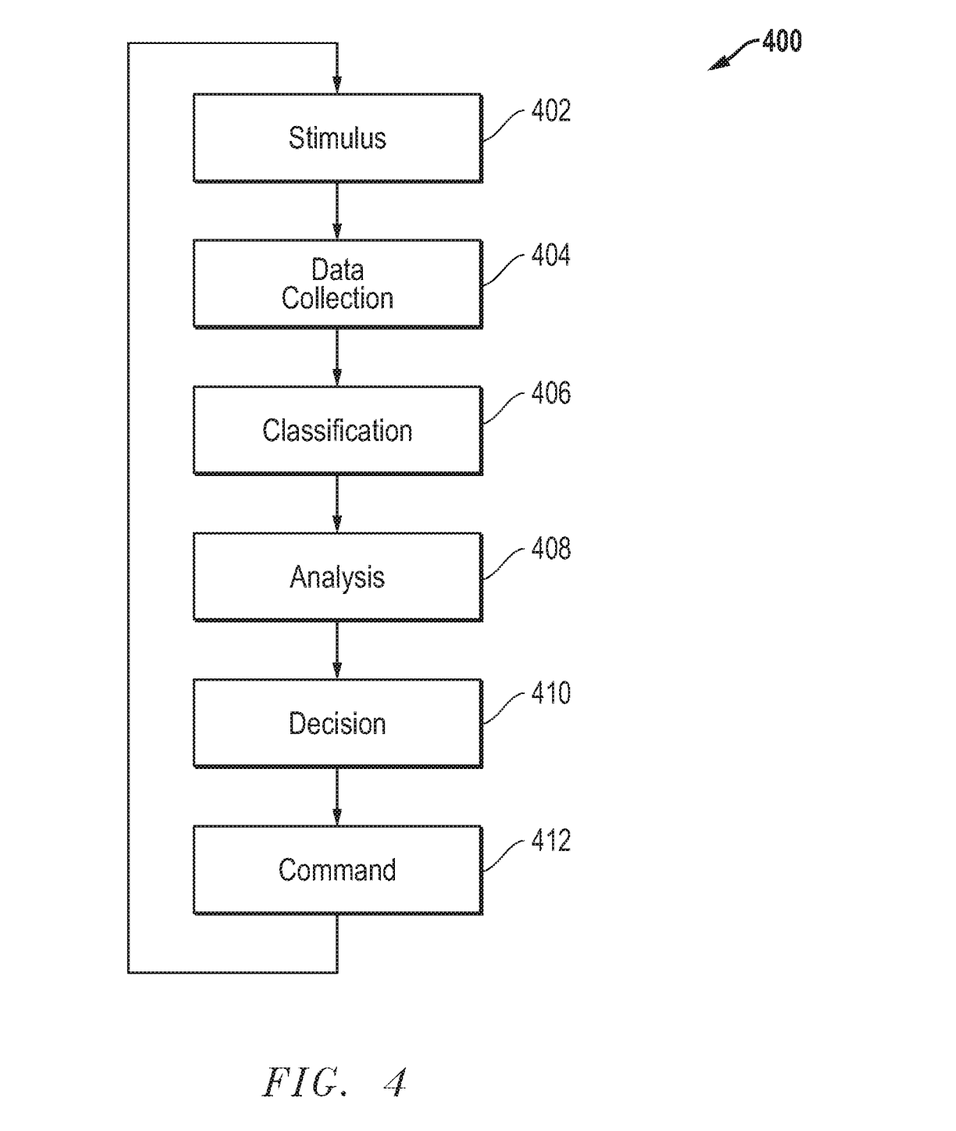
FIG. 4 illustrates methodology according to one exemplary embodiment of the disclosed systems and methods.

Below is one example embodiment of CLI walking commands:
CLI Configuration Walk example command
>Switch(console)# walk config
CLI Show Walk example command
>Switch(console)# Switch# walk show
CLI Show Walk example command
>Switch(console)# Switch# walk help FIG. 4 illustrates exemplary methodology 400 for performing the knowledge building of step 304 for CLI command structure and device behavior of each network device 278 in further detail. As shown in step 402 of FIG. 4, a CLI stimulus such as "help" (e.g., help command; "?, -h, /?, /h, -help, or —help"; partially completed command name with "?" appended; "command "+"?, -h, /?, /h, -help, or —help"; command keyword+"?, -h, /?, /h, -help, or —help"; walkconfig, walkshow, walkhelp, etc.), interrogation command, or CLI command phrase is issued (e.g., by information handling system 250 across network 276) to the given network device 278 being interrogated. The interrogated network device 278 responds (e.g., to information handling system 250) back across network 276 with a text based CLI response that includes CLI output data such as—error messages, an error location, success messages, help messages, command keywords, command arguments or parameters, valid values or range for parameters and arguments, running/startup configuration output, or CLI prompt (indicating no response). In step 404, the data from the CLI response is collected and parsed, and further CLI interrogation commands issued to the given network device 278 if additional CLI data is required (e.g., such as child commands, command keywords, command arguments, command parameters, command flags, command switches, help message, command output content and command output data).

Next, in step 406 of FIG. 4, the CLI data from the CLI response is classified, e.g., as a new command, continuation of a command, CLI mode change, error response, an interrupt (such as CLI message, syslog message, or similar), end of line, etc. After the classification step 406, the resulting classified CLI data is analyzed in step 408, as well as current location in CLI command structure (e.g., the sequence of commands required to reach current location from initial CLI login prompt), current state of network device or devices (e.g., is the device 278 operational and responding to ontology build 203 over network 276 with device login; connection session established in 302; state and operational values reported by device interfaces, device running configuration; device startup configuration). Based on this analysis, the next set of possible steps or commands is determined in step 408. For example, analysis has determined that there is more argument/parameter syntax and help message information to collect for command or analysis may determine that all the commands information have been collected for the configuration mode. In step 410, command options are reviewed against objectives for analyzing the given network device 278, and based on this review a decision is made regarding the next steps to take for the given network device 278, and in what sequence. Examples of such next steps and sequence include exiting current CLI mode, sending a CLI command with an additional argument, exiting cli learning 304. Finally in step 412, a next set of commands is created to issue to the given network device 278. Examples of such next set of commands include command+(keywords, arguments, parameters, switches), command+help commands ("?, -h, /?, /h, -help, or —help"), help command (e.g. "help", "?"), control keys, logout/login, exiting current CLI mode.

Returning now to FIG. 3, the CLI knowledge model is created in step 306 by structuring and storing the CLI data in a knowledge model in any suitable form, such as SQL, XML, HTML, NetConf/Yang, etc. Such CLI knowledge model data may be stored, for example, on media drive/s 285 and/or main memory 265 of information handling system 250. In one exemplary embodiment, the CLI data may be stored using one or more of the following ontology related standards: ISO 13584/15926 Industrial automation systems and integration, ISO15944 Business Operation View (including Accounting and economic ontology), ISO 24800 Registration, identification and management of schema and ontology, ISO 19132 Geographical Information—Location-based services—Reference model, ISO 11179 Metadata Registries standard, ISO 19763 Meta-Model Framework Standard, ISO 20944 Metadata Registry Interoperability and Bindings, ISO 19763 Meta Model for interoperability and for ontology registration, ISO 13250 Topic Maps, ISO 18048 Topic Map Query Language (TMQL), ISO 19756 Topic Maps Constraint Language, ISO 18629 Process Specific Language, ISO 19115 Geospatial Meta Standards, ISO 24707 Common Logic Standard, ISO 21127 Cultural Heritage Information Ontology, OMG Ontology Definition Meta-Model Standard, W3C Semantic Web Services Framework (includes Semantic Web Services Language and Semantic Web Services Ontology); and may be optionally integrated with content management systems such as Microsoft SharePoint, Drupal 7 and IBM Web Content Manager, and may be optionally integrated with Semantic Web Applications such as Twine, GoodRelations, IGLOO, Freebase, Evri.

Next, in step 308, ontology build module 203 terminates by reviewing CLI knowledge model data of step 306 for completeness and accuracy, e.g., by reviewing if CLI response output data has been collected for all CLI commands initiated in step 302 and then found in steps 304, 306; and/or by reviewing if the CLI response data is in the expected format defined at the time of seed learning 302. Based on this review, the CLI knowledge model data may be tuned by making any required adjustments (e.g., such as how to parse CLI response output data, how to check the state of the device(s), etc.). Need for such tuning may be determined, for example, based on a review of the knowledge model data by one or more human users to ensure that CLI data has been properly captured, based on execution of the captured device commands of the CLI data and monitoring how they execute, etc. Feedback may be obtained from observing parameters such as where CLI response output data collection failed, current device(s) state, last known configuration mode, observing last known log of CLI capturing CLI usage, etc. Improvements (e.g., such as enhancing the parsing of the text based CLI response output data) may accordingly be made to the prior steps of methodology 300 or as a part of ontology building 203.

Next, methodology 300 proceeds to ontology implementation steps 310-312. These steps may be done, for example during the runtime of the NMS 202, or the NMS may be brought down. In deployment step 310, command options (e.g., such as configuration commands, help commands, and show commands) may be reviewed versus NMS functional objectives (e.g., such as read device configuration and write device configuration) for the network device 278 analyzed in the preceding steps of ontology build module 203. Based on this review, the following types of actions may be taken: analyzing the model for data integrity and correctness, and loading knowledge model into NMS 202. In this regard, deployment step 310 may include performance of the tasks of loading the CLI knowledge model into the NMS data storage (e.g., on media drive/s 285 and/or main memory 265 of information handling system 250) and then using NMS 202 to analyze, interpret and bind the knowledge model to one or more NMS functions (e.g., configuration, firmware download/upload, user interface, performance management, fault management, topology, accounting, etc.)

In deployment step 310, the next steps for the analyzed network device 278 may also be determined, together with the sequence of these steps. In this regard, types of steps (e.g., such as loading, verifying and parsing the model) may be determined based on device type, manufacture, device functional role in the network, etc. The sequence of such steps may be determined based on whether the NMS 202 is actively managing the target device that is implemented by the knowledge model or if the user chooses to limit the scope of the knowledge model to be loaded in the NMS 202. In one embodiment, at any time during operation of NMS 202, use of the knowledge model steps 302 through 312 can repeated starting at any step to update, refine or improve the knowledge model.

Figure 5:
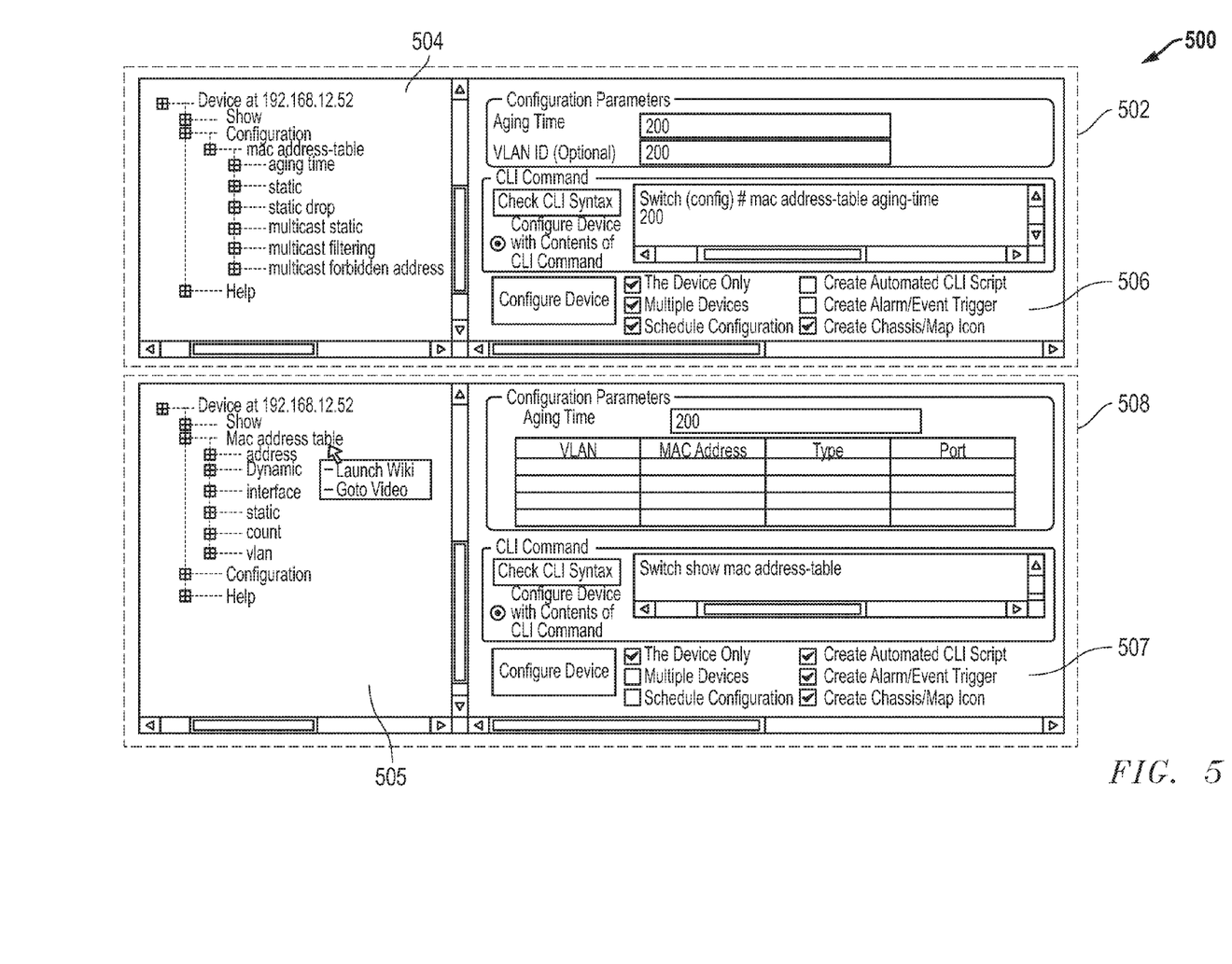
FIG. 5 illustrates a graphical user interface (GUI) according to one exemplary embodiment of the disclosed systems and methods.

Finally, in step 312, a graphical user interface (GUI) is created at runtime based on the CLI knowledge model created by the previous steps of methodology 300, and presented on display device 275. One example of such a created configuration management runtime GUI 500 is illustrated in FIG. 5. Using such a runtime GUI, user input may be collected from a user (e.g., with input/output devices 297/295). The runtime GUI may then use the data of the built and implemented CLI knowledge model to issue commands to the CLI of the network devices 278 across network 276 and to receive and process CLI responses from the network devices 278 from across network 276. Examples of such issued commands include "access-list alpha permit ip" and "ip ospf network ?", and examples of corresponding Reponses include "192.168.77.171 0.0.0.0 any"_"broadcast Set the OSPF network type to Broadcast". The NMS 202 may utilize two or more revisions of a knowledge model for the device of the same model because each device 278 may be running the different firmware/software/operating system revisions which may result in different device CLIs.

Referring now to FIG. 5, configuration management runtime GUI 500 created in step 312 of FIG. 3 may include dual user interface segments or windows 502 and 508. Write interface window 502 includes a configuration tree 504 and input interface 506 for writing information to a given network device 278, in this case a particular selected network device 278 having an IP address of 192.168.12.52 on network 276. Read back interface window 508 includes a configuration tree 505 and input interface 507 for reading CLI response information back from the same given network device 278 that is written to by interface window 502. GUI 500 allows a user of information handling system 250 to input and write CLI queries to a network device 278 using write interface window 502 having a given IP address, and to receive available CLI commands on read back 508 for that same device.

In one exemplary embodiment, NMS 202 may be implemented as follows employing configuration management runtime GUI 500. First, NMS 202 loads the CLI knowledge model (e.g., a CLI knowledge model as created, stored and optionally updated using methodology of FIGS. 3 and 4) by selecting a starting point in the CLI knowledge model for collecting data from a given network device 278 selected by a user, e.g., by entering the IP address of the particular network device 278. Next, NMS 202 presents the user or operator of information handling system 250 with a tree hierarchy view 504 of the CLI command structure of the selected network device 278. This tree is obtained by "walking" the CLI as previously described for that particular network device 278. The user may click to expand the tree node which causes NMS 202 to update the tree 504 based on CLI knowledge model information. Next, the user may select and click on a particular CLI command tree node of tree hierarchy 504 to view device data related to that particular selected CLI command. NMS 202 responds to this selection by dynamically generating GUI screen 506 for that particular selected CLI command by using the CLI knowledge model to determine what fields and data to display. Screen rendering may be done by the NMS 202 independent of the CLI knowledge model.

Screen 506 may present a user with one or more options for configuration of one or more network device/s 278. For example, as shown in the exemplary embodiment of FIG. 5, GUI screen 506 presents a user with the options of configuring one device only with selected parameter values, configuring a group of multiple devices with the same parameter values, or of creating a group operation to configure one or more devices in the future. This enables scheduling of configuration, and/or the ability to schedule other devices at a future date with the exact same configuration. GUI screen 506 also includes text boxes for entry of CLI change information by the user.

Still referring to FIG. 5, the CLI command box of GUI screen 506 displays what specific CLI command/s will be sent to the selected network device 278, and the contents of the CLI command box of GUI 506 may be edited by the user or operator to apply CLI command changes to the device 278, e.g., by accepting text entered by the user into the text boxes. Using this interactive CLI command box display methodology promotes user or operator trust by displaying what the NMS 202 is doing and by allowing the user or operator to present CLI commands to each network device 278 separately. Additionally, the CLI command box may be implemented as described to allow the user or operator to interactively learn how to use the CLI for network device/s 278. Moreover, this display methodology allows a user or operator to interactively write their own CLI command scripts. The data entered and displayed by GUI screen 506, and particularly by CLI command box of GUI 506, may be stored in a database (e.g., on media drive/s 285) for future configuration audits.

After accepting user or operator input into CLI command box of GUI screen 506, NMS 202 uses the CLI knowledge model to generate CLI commands associated with the user selection/s that were made using the CLI command box, and the NMS writes and sends corresponding commands to the given network device 278 across network 276. Then, NMS 202 reads and parses the response/s across network 276 from the given network device 278 using the CLI knowledge model, and based thereon dynamically constructs a runtime UI 508 based on a definition file that maps UI components to the CLI knowledge model output. In this embodiment of FIG. 5, transforming CLI structure into a UI tree results in easier transition between the NMS 202 and the CLI of the given device 278. This alignment may be implemented to enable common configuration training for users covering both the CLI of the network device 278 and the NMS 202.

Figure 6:
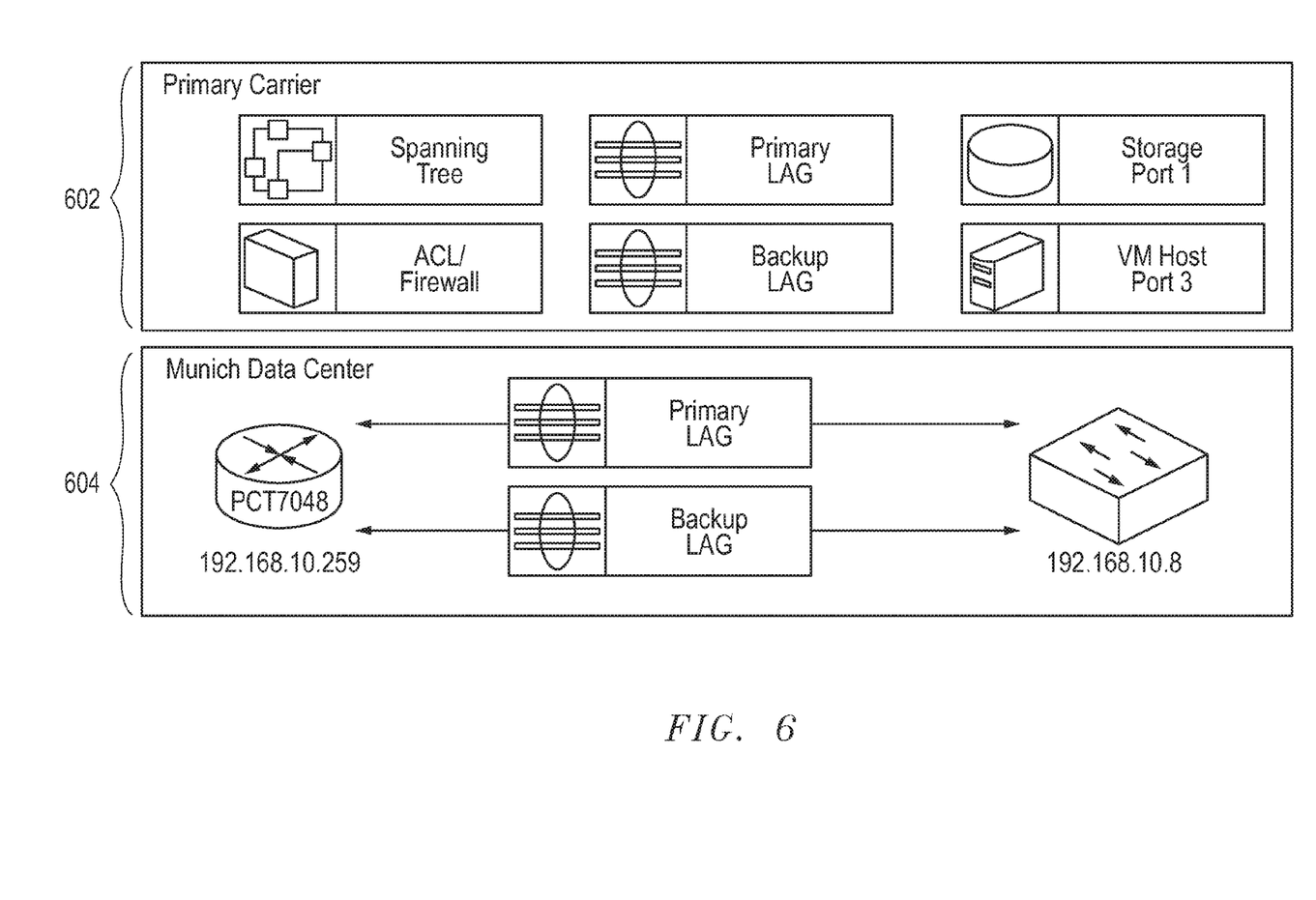
FIG. 6 illustrates a graphical user interface (GUI) according to one exemplary embodiment of the disclosed systems and methods.

A CLI knowledge model and runtime UI may be optionally extended in one exemplary embodiment to provide custom discrete interactions between CLI and icons, and custom NMS chassis views and custom NMS topology symbols may be generated. In this regard, FIG. 6 illustrates examples of customized UI views 602 and 604 for a given network device 278 (e.g., such as a network switch 218 of FIG. 2B) that may be optionally created and/or modified using NMS 202 in one exemplary embodiment for display (e.g., on display device 275 of FIG. 2A). In the example shown in FIG. 6, customized chassis view 602 and customized network topology (map) view 604 represent dashboard views of the given network device 278, and each are shown in FIG. 6 including icons for link aggregation (LAG) trunks, although this is only an illustrative example. In this example, one or more CLIs may be created using NMS 202 to update the LAG icons, and LAG icons may be updated while chassis view 602 or network topology view 604 is open. Moreover, icon layout may be exported or imported from a graphics program (e.g., such as Microsoft Visio) to add new icons, modify layouts, and/or incorporate layouts into specifications.

In one exemplary embodiment, UI views may be implemented using color schemes to indicate current status, with a given color of a given icon representing the current status of a network characteristic represented by that given icon and a change in color of the given icon representing a change in status of the network characteristic represented by that given icon. For example, Spanning Tree icon of UI 602 may be colored green to indicate no loops detected, ACL icon of UI 602 may be colored red to indicate a security issue has been detected, Primary LAG icons of UIs 602 and 604 may be colored green to show status is normal, Backup LAG icons of UIs 602 and 604 may be colored blue to indicate provisioned but not in use, iSCSI Storage Port icon of UI 602 may be colored green to indicate that the port configuration is correct, and VM Host Port icon of UI 602 may be colored yellow to indicate that the traffic is exceeding thresholds. It will be understood that these particular described icons and icon colors are exemplary only.

Figure 7:
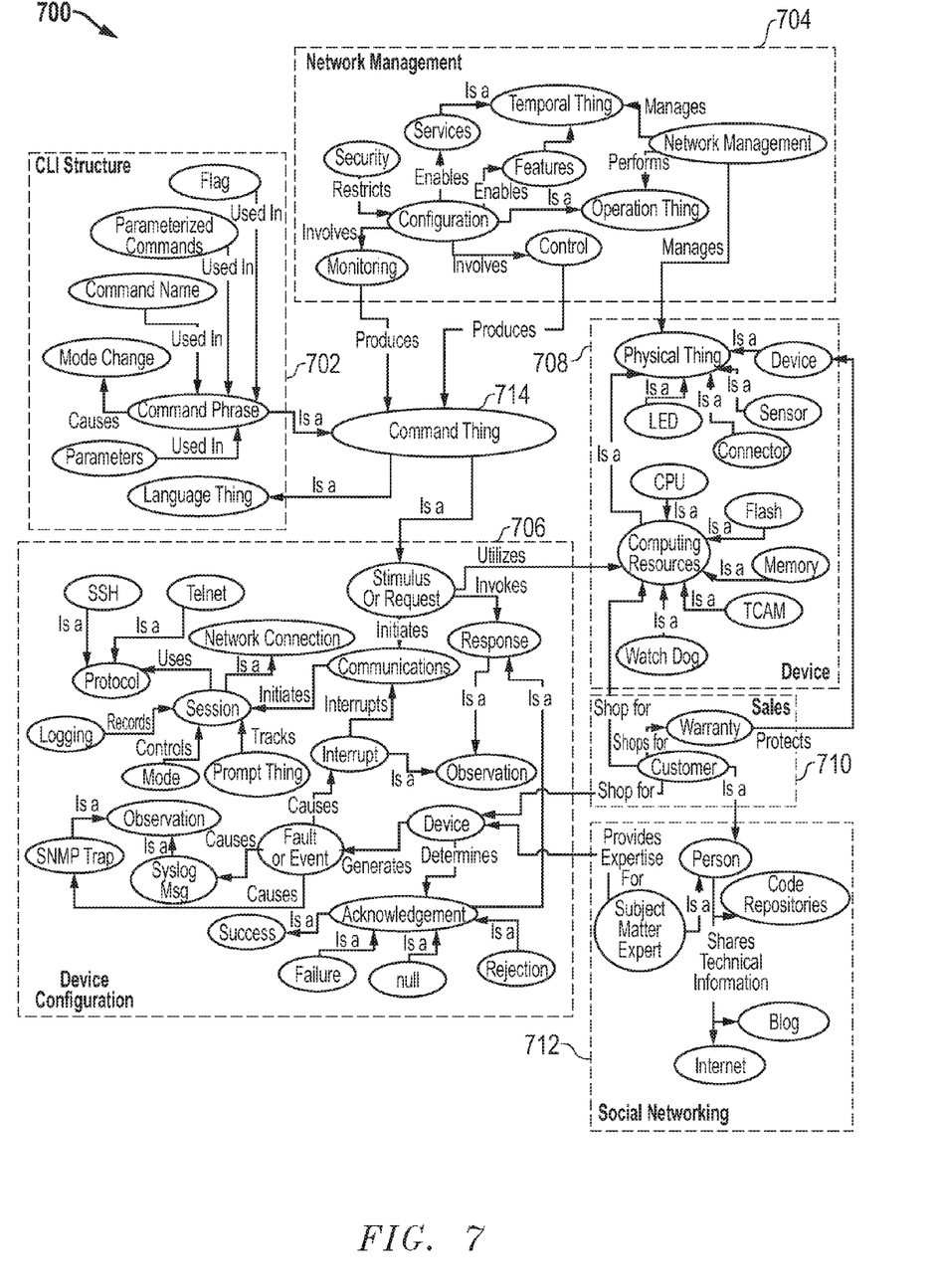
FIG. 7 illustrates a domain ontology-based CLI knowledge model relationship according to one exemplary embodiment of the disclosed systems and methods.

Ontology embodies a view of the world with respect to a domain or set of domains. FIG. 7 illustrates domain ontology-based CLI knowledge model relationship 700 as it may be implemented according to one exemplary embodiment of the disclosed systems and methods. In this regard, it will be understood that such an ontology relationship is a representation of knowledge as a set of concepts within a domain, and also describes the relationships between those concepts and domains. In this regard, an ontology relationship may represent concepts (such as entities, ideas, events, processes, and activities along with their respective properties, definitions and relations), according to domain category system.

As shown, ontology-based CLI knowledge model relationship 700 includes multiple domain categories that include CLI structure 702, network management 704, device configuration 706, device 708 (e.g., corresponding to network devices 278), sales 710, and social networking 712. Each of these domain categories includes multiple concepts therein that are interlinked with other concepts in the same and/or different domain category of ontology-based CLI knowledge model relationship 700 in the manner shown. In one embodiment, the NMS 202 may use the network of relationships in 700 to track what concepts are interlinked, to navigate and explore the relationships as a network of links in the knowledge model. The NMS 202 may use the knowledge model to understand how changes to one concept impact or require use of other concepts and domains.

CLI knowledge model relationship 700 of FIG. 7 may be referred to as a conceptual model, topic map, or domain ontology. As shown, at the center of the ontology-based CLI knowledge model relationship 700 of this embodiment is CommandThing 714 that represents a central concept/domain and focal point that allows the NMS 202 to communicate across network 276 with the devices 278 of category 708. CommandThing 714 also provides a central concept/domain and focal point to allow the NMS 202 to identify and connect a user/s across network 276 (e.g., Intranet or any other suitable network communicatively coupled to information handling system 250) to one or more of the following devices or resources: websites and web servers $277_1$ to $277_n$, network devices 278 of category 708, shopping/sales category 710, and CLI information (such as CLI structure category 702, network management category 704, and device configuration category 706) that is available from subject matter experts (e.g. via social networking category 712). CommandThing 714 may also represent a central concept/domain and focal point for the NMS 202 to communicate with network device support services (e.g., via device category 708 and shopping category 710) that are available for sale in shopping category 710. It will be understood that the particular illustrated domain categories and concepts are exemplary only, and that additional, fewer or alternative domains, concepts, topics and/or categories may be included in an ontology-based CLI knowledge model relationship. Thus, an ontology-based CLI knowledge model may link a NMS 202 to one or more devices and/or network resources such as web content management systems, semantic web applications, shopping portals or services, warranty services, test and design tools, auto generated CLI manuals, or a combination thereof.

Ontology-based CLI knowledge model relationship 700 may be employed to create and/or modify components of configuration management runtime GUI 500, e.g., based on user selection of particular topics in either configuration tree 504 of write interface window 502, and/or configuration tree 505 of read interface window 508. For example, in one exemplary embodiment a user selection or entry in interface windows 502 or 508 of a configure command phrase or show command phrase (i.e., CommandThing) results in configuration change to a device or viewing of device configuration respectively.

In one example embodiment, the NMS 202 may use the CLI knowledge model to display device parts from category 708, books from category 710, and DVDs from category 710 available from Amazon and recommended by co-workers 712 or equipment vendors 712 related to a given device 278 being view by the user. The user may find outside assistance related to a CLI command (e.g., access control list) related to the given device 278 by using the NMS 202 to link to Semantic Web Applications of category 712, Wikis from category 712, Blogs from category 712, or code repositories from category 712 where example user scripts 702/704 may be found. A user may also use the CLI knowledge model to locate contracting services from category 710, warranty services from category 710, and/or support services from category 710 for the given device 278 being managed by the NMS 202. The NMS 202 may use the CLI knowledge model to collect GPS location information from the device 278 to place an icon for the given device 278 on a mapping website from category 712.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

It will be understood that one or more of the tasks, functions, or methodologies described herein (e.g., including those performed by NMS 202 and methodologies 300 and 400) may be may be implemented by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform the one or more steps of NMS 202 and methodologies 300 and 400, etc. A computer program of instructions may be stored in or on the non-transitory computer-readable medium residing on or accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodology may be employed in one or more code segments of the computer program. For example, a code segment executed by the information handling system may include one or more steps of the disclosed methodology.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
one or more processing devices configured to execute a network management system (NMS) that includes an ontology-based command line interface (CLI) knowledge model;
where the one or more processing devices of the information handling system are configured to be communicatively-coupled across a network to one or more network devices of a networking system;
where the one or more processing devices are configured to execute the NMS to maintain and administer the networking system using the ontology-based CLI knowledge model;
where the ontology-based command line interface (CLI) knowledge model includes one or more domain categories, each of the domain categories including multiple concepts therein that are interlinked with other concepts in the same or different domain category of the ontology-based CLI knowledge model to define the relationship between the separate interlinked concepts; and
where the ontology-based CLI knowledge model comprises an ontology build module and an ontology implementation module, the one or more processing devices configured to execute the ontology build module to initiate the CLI knowledge model with new CLI data for the CLI characteristics of new network devices and to update the CLI knowledge model with CLI data for changes in CLI characteristics of existing network devices as one or more ontology build steps, and to execute the ontology implementation module concurrently with the ontology build module as one or more ontology implementation steps such that the ontology implementation module continues to execute using the new CLI data and updated CLI data as it is provided by the ontology build module.

2. The information handling system of claim 1, where the information handling system further comprises at least one display device; and where the one or more processing devices are configured to execute the ontology implementation module as ontology implementation steps that comprise:
presenting a created runtime GUI on the display device;
allowing a user of the information handling system to use the GUI to input and write one or more CLI queries to a network device having a given IP address; and
using the GUI to provide the user with CLI response information back received back from the same given network device in response to the one or more CLI queries.

3. An information handling system, comprising:
one or more processing devices configured to execute a network management system (NMS) that includes an ontology-based command line interface (CLI) knowledge model;
where the one or more processing devices of the information handling system are configured to be communicatively-coupled across a network to one or more network devices of a networking system;
where the one or more processing devices are configured to execute the NMS to maintain and administer the networking system using the ontology-based CLI knowledge model;
where the ontology-based command line interface (CLI) knowledge model includes one or more domain categories, each of the domain categories including multiple concepts therein that are interlinked with other concepts in the same or different domain category of the ontology-based CLI knowledge model to define the relationship between the separate interlinked concepts; and
where the ontology-based CLI knowledge model comprises an ontology build module, the one or more processing devices are configured to execute the ontology build module as one or more ontology build steps that comprise:
a seed learning step where build parameter information is received by the ontology build module,
a learning and knowledge building step for CLI command structure and network device behavior where each given one of the network devices is interrogated over the network to elicit and receive a response from the given network device describing one or more of the CLI characteristics it possesses, and
a CLI knowledge model creation step where the one or more CLI characteristics received from each given network device is organized as CLI data to create a CLI knowledge model.

4. The information handling system of claim 3, where the one or more processing devices are configured to organize the one or more CLI characteristics received from each given network device as CLI data using ontology related standards.

5. The information handling system of claim 3, where the one or more processing devices are configured to execute the NMS such that the ontology-based CLI knowledge model links the NMS to at least one of: web content management systems, semantic web applications, shopping portals or services, warranty services, test and design tools, auto generated CLI manuals, or a combination thereof.

6. The information handling system of claim 3, where the one or more processing devices are configured to execute the ontology build module to control the starting and stopping points of the ontology build steps.

7. The information handling system of claim 3, where the one or more processing devices are configured to execute the learning and knowledge building step to:
classify CLI response data received from the given network device;
analyze the classified CLI data, current location of the classified data in the CLI command structure of the given network device, and the current state of the given network device; and
determine a next set of commands based on the analyzed classified CLI data.

8. The information handling system of claim 3, where the one or more processing devices are configured to execute the ontology build module as one or more ontology build steps that further comprise:
reviewing the created CLI knowledge model data to determine at least one of:
whether CLI response data has been collected for all CLI commands initiated in seed learning step and then found in the learning and knowledge building step and the CLI knowledge model creation step,
whether the CLI response data is in the expected format defined in the seed learning step, or
a combination thereof.

9. The information handling system of claim 8, where the one or more processing devices are configured to execute the ontology build module as one or more ontology build steps that further comprise:
determining whether or not to tune the CLI knowledge model data based on at least one of a review of the knowledge model data by one or more human users to ensure that CLI response data has been properly captured, based on execution of the captured device commands of the CLI data and monitoring how they execute, or a combination thereof.

10. The information handling system of claim 8, where the one or more processing devices are configured to execute the ontology build module as one or more ontology build steps that further comprise:
then tuning the CLI knowledge model data by making any required adjustments to at least one of how the CLI response data is parsed, how a state of the current network device is determined, or a combination thereof.

11. The information handling system of claim 3, where the one or more processing devices are configured to execute the learning and knowledge building step to:
collect and parse the CLI response data received from the given network device to determine if additional CLI response data is needed; and
interrogate the given one of the network devices over the network to elicit and receive additional CLI response data from the network device.

12. The information handling system of claim 11, where the additional CLI response data from the network device comprises at least one of child commands, command keywords, command arguments, command parameters, command flags, command switches, help message, command output content, command output data, or a combination thereof.

13. The information handling system of claim 4, where the one or more processing devices are configured to execute the CLI knowledge model creation step to organize the one or more CLI characteristics received from each given network device as CLI data using at least one of the following ontology related standards: ISO 13584/15926 Industrial automation systems and integration, ISO15944 Business Operation View, ISO 24800 Registration, identification and management of schema and ontology, ISO 19132 Geographical Information—Location-based services—Reference model, ISO 11179 Metadata Registries standard, ISO 19763 Meta-Model Framework Standard, ISO 20944 Metadata Registry Interoperability and Bindings, ISO 19763 Meta Model for interoperability and for ontology registration, ISO 13250 Topic Maps, ISO 18048 Topic Map Query Language (TMQL), ISO 19756 Topic Maps Constraint Language, ISO 18629 Process Specific Language, ISO 19115 Geospatial Meta Standards, ISO 24707 Common Logic Standard, ISO 21127 Cultural Heritage Information Ontology, OMG Ontology Definition Meta-Model Standard, or W3C Semantic Web Services Framework.

14. A method of managing a networking system, comprising:
providing an information handling system, the information handling system comprising one or more processing devices communicatively-coupled across a network to one or more network devices of the networking system; and
using the one or more processing devices to execute a network management system (NMS) that includes an ontology-based command line interface (CLI) knowledge model to maintain and administer the networking system using the ontology-based CLI knowledge model;
where the ontology-based command line interface (CLI) knowledge model includes one or more domain categories, each of the domain categories including multiple concepts therein that are interlinked with other concepts in the same or different domain category of the ontology-based CLI knowledge model to define the relationship between the separate interlinked concepts;
where the ontology-based CLI knowledge model comprises an ontology build module and an ontology implementation module, and where the method further comprises using the one or more processing devices to execute the ontology build module to initiate the CLI knowledge model with new CLI data for the CLI characteristics of new network devices and to update the CLI knowledge model with CLI data for changes in CLI characteristics of existing network devices as one or more ontology build steps, and to execute the ontology implementation module concurrently with the ontology build module as one or more ontology implementation steps such that the ontology implementation module continues to execute using the new CLI data and updated CLI data as it is provided by the ontology build module.

15. The method of claim 14, where the information handling system further comprises at least one display device; and where the method further comprises using the one or more processing devices to execute the ontology implementation module as ontology implementation steps that comprise:
presenting a created runtime GUI on the display device;
allowing a user of the information handling system to use the GUI to input and write one or more CLI queries to a network device having a given IP address; and
using the GUI to provide the user with CLI response information back received back from the same given network device in response to the one or more CLI queries.

16. A method of managing a networking system, comprising:
providing an information handling system, the information handling system comprising one or more processing devices communicatively-coupled across a network to one or more network devices of the networking system; and
using the one or more processing devices to execute a network management system (NMS) that includes an ontology-based command line interface (CLI) knowledge model to maintain and administer the networking system using the ontology-based CLI knowledge model;
where the ontology-based command line interface (CLI) knowledge model includes one or more domain categories, each of the domain categories including multiple concepts therein that are interlinked with other concepts in the same or different domain category of the ontology-based CLI knowledge model to define the relationship between the separate interlinked concepts; and
where the ontology-based CLI knowledge model comprises an ontology build module, and where the method further comprises using the one or more processing devices to execute the ontology build module as one or more ontology build steps that comprise:
a seed learning step where build parameter information is received by the ontology build module,
a learning and knowledge building step for CLI command structure and network device behavior where each given one of the network devices is interrogated over the network to elicit and receive a response from the given network device describing one or more of the CLI characteristics it possesses, and
a CLI knowledge model creation step where the one or more CLI characteristics received from each given network device is organized as CLI data to create a CLI knowledge model.

17. The method of claim 16, further comprising using the one or more processing devices to organize the one or more CLI characteristics received from each given network device as CLI data using ontology related standards.

18. The method of claim 17, where the one or more processing devices are configured to execute the CLI knowledge model creation step to organize the one or more CLI characteristics received from each given network device as CLI data using at least one of the following ontology related standards: ISO 13584/15926 Industrial automation systems and integration, ISO15944 Business Operation View, ISO 24800 Registration, identification and management of schema and ontology, ISO 19132 Geographical Information—Location-based services—Reference model, ISO 11179 Metadata Registries standard, ISO 19763 Meta-Model Framework Standard, ISO 20944 Metadata Registry Interoperability and Bindings, ISO 19763 Meta Model for interoperability and for ontology registration, ISO 13250 Topic Maps, ISO 18048 Topic Map Query Language (TMQL), ISO 19756 Topic Maps Constraint Language, ISO 18629 Process Specific Language, ISO 19115 Geospatial Meta Standards, ISO 24707 Common Logic Standard, ISO 21127 Cultural Heritage Information Ontology, OMG Ontology Definition Meta-Model Standard, or W3C Semantic Web Services Framework.

19. The method of claim 16, further comprising using the one or more processing devices to execute the NMS such that the ontology-based CLI knowledge model links the NMS to at least one of web content management systems, semantic web applications, shopping portals or services, warranty services, test and design tools, auto generated CLI manuals, or a combination thereof.

20. The method of claim 16, further comprising executing the ontology build module to control the starting and stopping points of the ontology build steps.

21. The method of claim 16, further comprising using the one or more processing devices to execute the learning and knowledge building step to:
classify CLI response data received from the given network device;
analyze the classified CLI data, current location of the classified data in the CLI command structure of the given network device, and the current state of the given network device; and
determine a next set of commands based on the analyzed classified CLI data.

22. The method of claim 16, further comprising using the one or more processing devices to execute the ontology build module as one or more ontology build steps that further comprise:
reviewing the created CLI knowledge model data to determine at least one of:
whether CLI response data has been collected for all CLI commands initiated in seed learning step and then found in the learning and knowledge building step and the CLI knowledge model creation step,
whether the CLI response data is in the expected format defined in the seed learning step, or
a combination thereof.

23. The method of claim 22, further comprising using the one or more processing devices to execute the ontology build module as one or more ontology build steps that further comprise:
determining whether or not to tune the CLI knowledge model data based on at least one of a review of the knowledge model data by one or more human users to ensure that CLI response data has been properly captured, based on execution of the captured device commands of the CLI data and monitoring how they execute, or a combination thereof.

24. The method of claim 22, further comprising using the one or more processing devices to execute the ontology build module as one or more ontology build steps that further comprise:
then tuning the CLI knowledge model data by making any required adjustments to at least one of how the CLI response data is parsed, how a state of the current network device is determined, or a combination thereof.

25. The method of claim 16, further comprising using the one or more processing devices to execute the learning and knowledge building step to:
collect and parse the CLI response data received from the given network device to determine if additional CLI response data is needed; and
interrogate the given one of the network devices over the network to elicit and receive additional CLI response data from the network device.

26. The method of claim 25, where the additional CLI response data from the network device comprises at least one of child commands, command keywords, command arguments, command parameters, command flags, command switches, help message, command output content, command output data, or a combination thereof.

* * * * *